May 17, 1960 W. F. STANFORD 2,936,541
FISHING TILT
Filed April 30, 1959
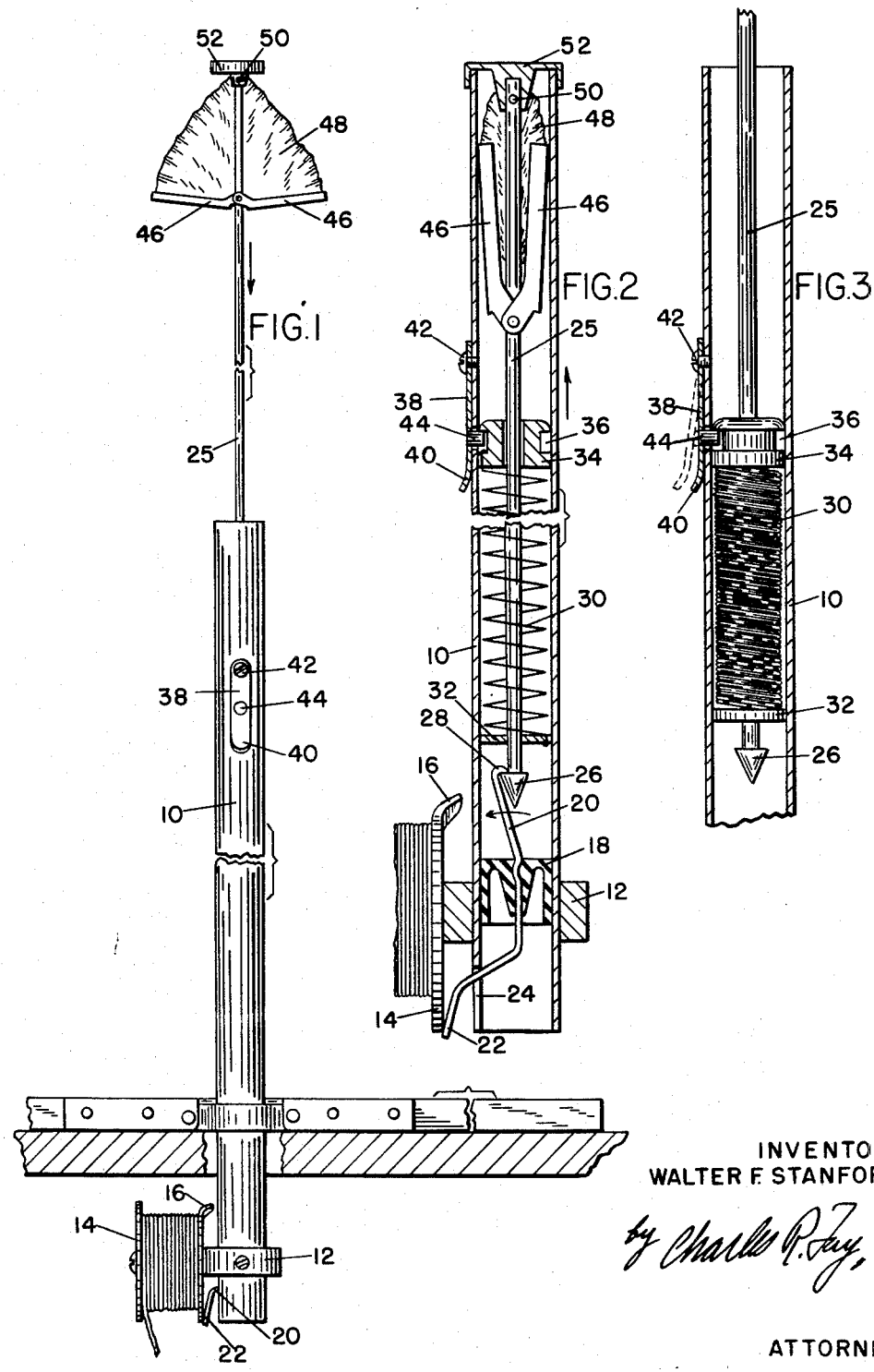
INVENTOR
WALTER F. STANFORD
by Charles P. Fay,
ATTORNEY

United States Patent Office 2,936,541
Patented May 17, 1960

2,936,541

FISHING TILT

Walter F. Stanford, Westboro, Mass.

Application April 30, 1959, Serial No. 810,156

3 Claims. (Cl. 43—17)

This invention relates to a new and improved fishing tilt or tip-up, and the principal object of the invention is to provide an improved construction which is operable under all conditions even where snow lies heavy on the ice and would ordinarily prevent the spring arm of the conventional prior art tilt from snapping up when the bait is taken by a fish; and other objects of the present invention reside in the provision of a tilt having a rod or mast which rises axially perpendicularly to the ice and does not snap up sideways as does the usual tensioned strip spring mast of the prior art, the present mast being substantially rigid and being provided with a spring whereby the same is spring loaded, there being a catch releasable in cooperation with the reel of the tilt enabling the spring to raise the mast as stated, when a fish takes the bait.

Other objects of the invention include the provision of an ice-fishing tilt comprising a tubular member having an elongated rigid mast reciprocably mounted therein and provided with a spring for tensioning the same in housed latched condition within said tube, said mast having a collapsible flag at one end thereof, and means holding said tubular member upright in a hole in the ice with a reel immersed in the water under the ice, so that when a fish takes the bait and rotates the reel, the latch is released, which in turn releases the spring causing the mast to rise vertically upwardly and the flag to open as it leaves the tubular member to warn the fisherman that he has a strike.

Other objects and advantages of the invention will appear hereinafter.

Reference is to be had to the accompanying drawings, in which

Fig. 1 is a view in elevation illustrating the invention;

Fig. 2 is a sectional view through the fishing tilt on an enlarged scale and showing the same in latched condition ready for use; and Fig. 3 is a view similar to Fig. 2 with parts omitted illustrating the mechanism in released condition thereof.

In carrying out this invention, the same is illustrated as comprising a hollow tubular member 10 which may be conveniently made of aluminum or similar material. Adjacent the lower end of this tubular member 10, it is provided with a ring or the like 12 which mounts a reel of more or less usual construction 14. This reel has a cam thereon as at 16, again more or less as is usual in the art.

The tubular member is provided adjacent the lower end thereof near the reel 14 with a resilient washer-like member 18 in which is yieldably mounted a movable trigger member 20. The trigger member has an exposed portion 22 extending outwardly through a longitudinal slot 24 in the tubular member, in position to be moved inwardly by cam 16 in order to release the mast to be described.

The mast comprises a rigid rod member 25 which has an arrowhead or the like catch at the lower end thereof indicated at 26. The trigger member 20 is provided with a head 28 in the path of the member 26 so as to hold the same in latched condition thereof as shown in Fig. 2, and to accept the head 28 for re-setting thereof.

The rod 25 is provided with a tension spring 30 which is connected to a base member or disc 32 on the rod, and to a head member 34 slidable on the rod and having an annular channel therein as at 36. In the condition of these parts as shown in Fig. 3, the spring 30 tends to bring the head member 34 and the disc member 32 together adjacent base member 32, the rod or mast 25 being shown raised.

Means is provided for stretching the spring and holding the same in extended condition, ready for operation, to extend mast 25 to the position shown in Fig. 1. There is provided a resilient movable spring-strip member 38 having a lip 40 for manual manipulation thereof. Member 38 is held to the tubular member 10 by means of a fastener 42. It is also provided with a latch member 44 which extends through an aperture in the tube into the interior thereof as plainly shown in Figs. 2 and 3, and is capable of holding member 34 by entering channel 36.

The mast 25 also mounts thereon a pair of pivoted members 46 to which is connected the flag member 48, this flag member also being connected as at 50 to a cap 52 which closes the tube 10, see particularly Fig. 2 in this regard. Springs not shown are used to expand members 46 to display the flag when released from the tube.

Assuming that the parts are set as shown in Fig. 2, with the latch member 28 in engagement with the arrowhead member 26, the cap 52 is seen to be in position closing the tube so that snow and ice cannot get into it.

However, if a fish takes the bait, the reel 14 is caused to rotate and the cam 16 impinges upon portion 22 of trigger member 20, thus moving the same in a direction to release the head 26. As soon as this head is released, the spring will cause the rod 25 to move rapidly upwardly in an axial or longitudinal direction thereof, and the cap 52 will rise, arms 46, 46 being released and causing the flag to be extended outwardly from the folded condition of Fig. 2 to the extended condition of 48. Any spring means (not shown) can be utilized for this purpose.

In order to re-set the device, it is merely necessary to push down on cap 52 and when the arrowhead member 26 arrives in its lowermost position as in Fig. 2, it will move past the head 28 with a camming action due to the fact that the trigger 20 is mounted in a resilient material or on a pivot so as to become relatched in stretched condition of spring 30.

If it is desired to close the tilt completely without any liability for accidental motion of the mast to the Fig. 1 condition, the fingernail is inserted under the lip 40 of the spring member 38, bringing the latch 44 outwardly to release it from the annular member 34. By a slight push inwardly, the member 34 then is located below the latch 44 so that when the rod 25 is pushed inwardly, the head 34 moves with it down towards the bottom of the tube, due to the spring. In this condition, the rod 25 is latched as above stated by means of members 20 and 26, but the spring not being under tension, the device will not act to project rod 25. Also at the same time the rod is latched in position and will not accidentally fall out and is only removable or extensible by manually moving the trigger member 20 to position, releasing member 26 as above described. This is done manually by moving the extending member 22 inwardly through slot 24 to the exterior of the device, completely releasing the arrowhead member 26.

When this has been done, the cap is grasped in one hand and the rod or mast withdrawn from the tube to a point where the projection 34 engages stop 44. The operator then inserts the fingernail under the lip 40 and raises latch 44 to a point where the projection 34 may slip partially past the same and then the operator releases the spring strip 38, allowing latch 44 to engage in channel 36 and projection 34. The mast may then be re-inserted to the Fig. 2 position, latching the same at 26 and 28, so that the device is ready for operation as above described.

Having thus described my invention and the advantages thereof, I do not wish to be limited to the details herein disclosed, otherwise than as set forth in the claims, but what I claim is:

1. A fishing tilt comprising a hollow tube, means to hold the tube upright, an elongated rod mounted therein for longitudinal motion from wholly concealed position within said tube to substantial exposed condition thereof, a flag on said rod, a latch on said rod, a reel, a trigger release device on said tube at the lower end thereof in cooperative relation with the reel, said trigger release device being adapted to catch said latch and temporarily hold the same with the rod concealed within the tube, said trigger release device comprising a generally axially arranged member within the tube, a portion of said member extending out of the tube, a projection on the member to engage the latch, a resilient element in the tube, the said member being yieldably held therein, a spring, means compressing said spring when the rod latch is engaged with the trigger release projection, said rod being projected directly vertically upwardly and axially relative to said tube upon actuation of the trigger release to retract the projection from the latch, and means on the reel to actuate the trigger release by displacing the member against the action of the resilient element holding the member.

2. The fishing tilt of claim 1 including a manually operated catch adjacent the upper end of the tube, and an annular member in said tube for engagement with said catch, said rod being slidably movable with relation to said annular member, the spring being connected to the latter and to said rod at the lower end of the latter.

3. The fishing tilt of claim 1 including a manually operated catch adjacent the upper end of the tube, and an annular member in said tube for engagement with said catch, said rod being slidably movable with relation to said annular member, the spring being connected to the latter and to said rod at the lower end of the latter, and means for moving said manual catch to permit the annular member to be moved below the catch so that the spring causes the annular member to be moved down toward the lower end of the rod, the rod being latched by the trigger release device but the spring being untensioned for purposes of carrying and storage, and the rod being manually retractable in order to allow the rod to be manually withdrawn by the cap to once more position the annular member in engaged relation with respect to said manual latching means.

References Cited in the file of this patent
UNITED STATES PATENTS

| | | |
|---|---|---|
| 2,693,046 | Langevin | Nov. 2, 1954 |
| 2,788,602 | Dzuba | Apr. 16, 1957 |